(12) United States Patent
Echartea et al.

(10) Patent No.: US 6,965,952 B2
(45) Date of Patent: Nov. 15, 2005

(54) BUS FRAMER

(75) Inventors: Jesus Palomino Echartea, Jal (MX); Gabriel Moreno, Jal (MX)

(73) Assignee: Intel Corporation, Santa Clara, CA (US)

( * ) Notice: Subject to any disclaimer, the term of this patent is extended or adjusted under 35 U.S.C. 154(b) by 599 days.

(21) Appl. No.: 10/032,743

(22) Filed: Oct. 25, 2001

(65) Prior Publication Data

US 2003/0084224 A1 May 1, 2003

Related U.S. Application Data

(60) Provisional application No. 60/329,809, filed on Oct. 15, 2001.

(51) Int. Cl.[7] .............................. G06F 3/00; G06F 12/00
(52) U.S. Cl. .................. 710/30; 710/100; 711/167; 711/170
(58) Field of Search .................. 710/2, 30, 100; 711/167, 170, 220–221; 370/217

(56) References Cited

U.S. PATENT DOCUMENTS

| 4,991,169 A | 2/1991 | Davis et al. |
| 6,208,664 B1 | 3/2001 | Plummer et al. |
| 6,351,452 B1 * | 2/2002 | Koenig et al. .............. 370/217 |

FOREIGN PATENT DOCUMENTS

WO    WO 00/44115    7/2000

* cited by examiner

*Primary Examiner*—Tim Vo
(74) *Attorney, Agent, or Firm*—Fish & Richardson P.C.

(57) ABSTRACT

A bus framer includes an engine which extracts information from a frame of data being transmitted over a time-division multiplexed bus and a processor which retrieves the information from the engine over an internal bus and forwards the information. The bus framer further includes a mapper which maps the frame of data on the time-division multiplexed bus to a read/write bus and a functional module which receives the data from the read/write bus.

30 Claims, 3 Drawing Sheets

BUS FRAMER

CROSS-REFERENCE TO RELATED APPLICATION

This application claims priority to U.S. Provisional Application No. 60/329,809, which was filed on Oct. 15, 2001 and titled "Sol Computer Architecture."

TECHNICAL FIELD

This invention relates generally to a bus framer and an architecture therefor.

BACKGROUND

A computer bus (or simply "bus") is a collection of wires over which data is transmitted between devices, such as a processor and a memory. Data is transferred over a bus in a specific format. For example, the data may be transferred in "frames". Generally speaking, a frame is a data structure that organizes data packets into time slots that specify the order in which the data packets are to be transferred. Other information may also be included in a frame, such as the port(s) to which data packets are to be transferred.

A framer is a device that receives data packets from a source and that forms frames from the data packets. The framer typically stores the frames in a buffer memory and transmits data packets from the buffer memory onto a bus at the appropriate time slots specified in the frame.

DESCRIPTION

Figure 1:
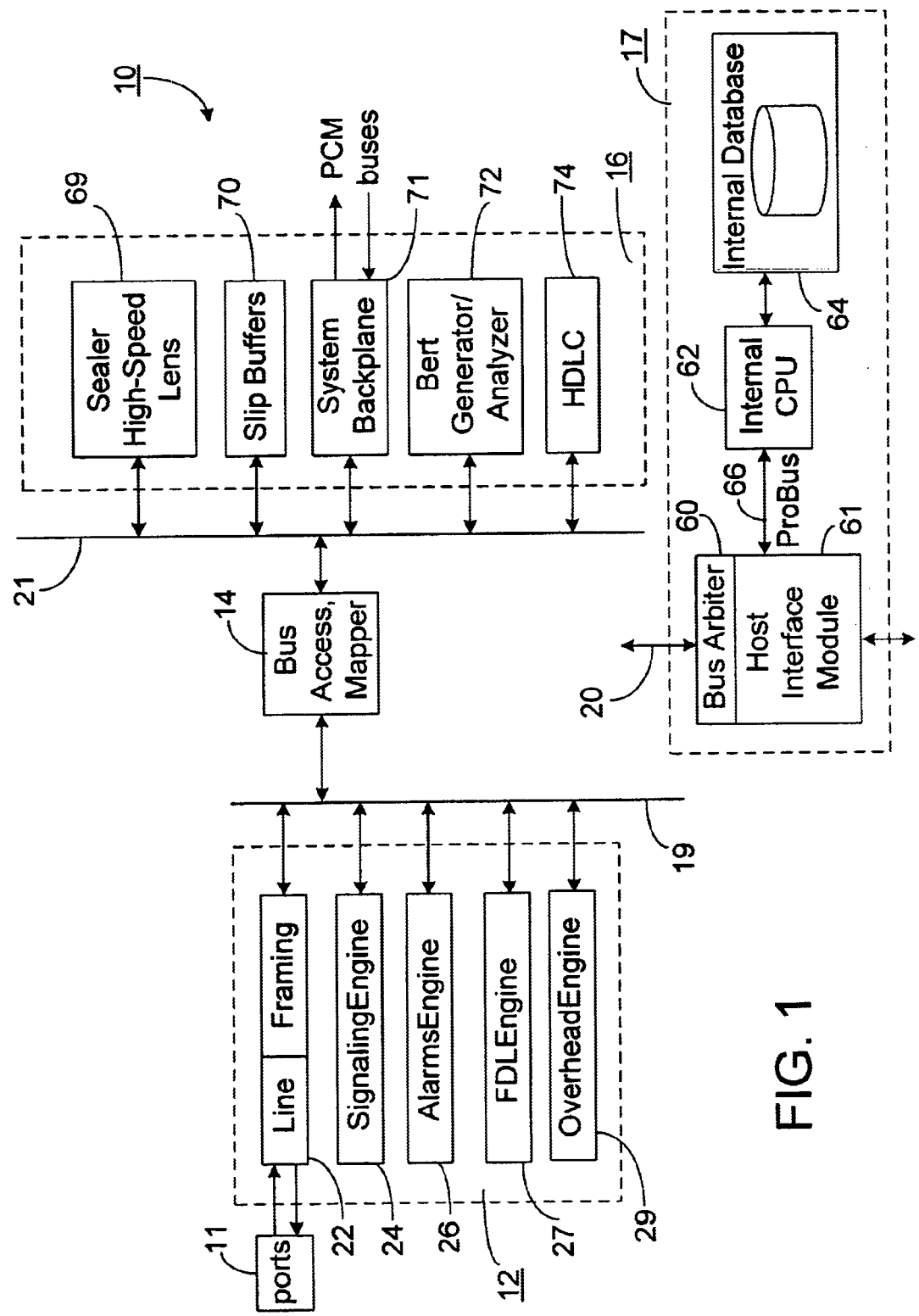
FIG. 1 is a block diagram of a bus framer.

Referring to FIG. 1, a bus framer 10 is shown. Bus framer 10 receives data from ports 11 of an external device (not shown), generates and transmits frames of the data, detects information in the frames, and stores that information in an internal database for, e.g., reporting to an external device (not shown). In this embodiment, framer 10 connects to a cluster of eight ports on a device; however, framer 10 is not limited as such. For example, framer 10 may connect to clusters of 128 E/T bus format ports.

Bus framer 10 contains engines 12, bus access mapper 14, functional modules 16, and circuitry 17. In this embodiment, these elements are implemented in hardware; however, they may be implemented in software or a combination of hardware and software. The elements are interconnected by various buses.

Frame bus 19 interconnects engines 12 and bus access mapper 14. Internal bus 20 interconnects engines 12, bus access mapper 14, circuitry 17, and functional modules 16. Read/write (R/W) bus 21 interconnects functional modules 16 and bus access mapper 14. Other buses may also be used.

Engines 12 include line/framing engine 22, signaling engine 24, alarms engine 26, facility data link (FDL) engine 27, and overhead engine 29. Line/framing engine 22 receives data from ports 11, performs any necessary encoding or decoding of the data, examines bits in the data to determine if the data is synchronized, generates frames of the data, stores the frames, or information related to the frame, in memory, and outputs the frames in the frame bus.

In this embodiment, each frame comprises a data structure 30 (see FIG. 2) having blocks of data arranged in N columns and M (e.g., 32) rows, where N and M are integers that are greater than one. Each block of data structure 30 includes data that is used with the bus frame protocol implemented by framer 10 and that corresponds to a destination port on a receiving device (not shown) and a time slot for the data. The destination port identifies a port on a receiving device to which the data is destined. The time slot provides an ordered relationship for the data transmitted to a port. Other data (not shown), such as signaling and alarm data, may also be included in the frame's data structure.

Figures 2, 3:
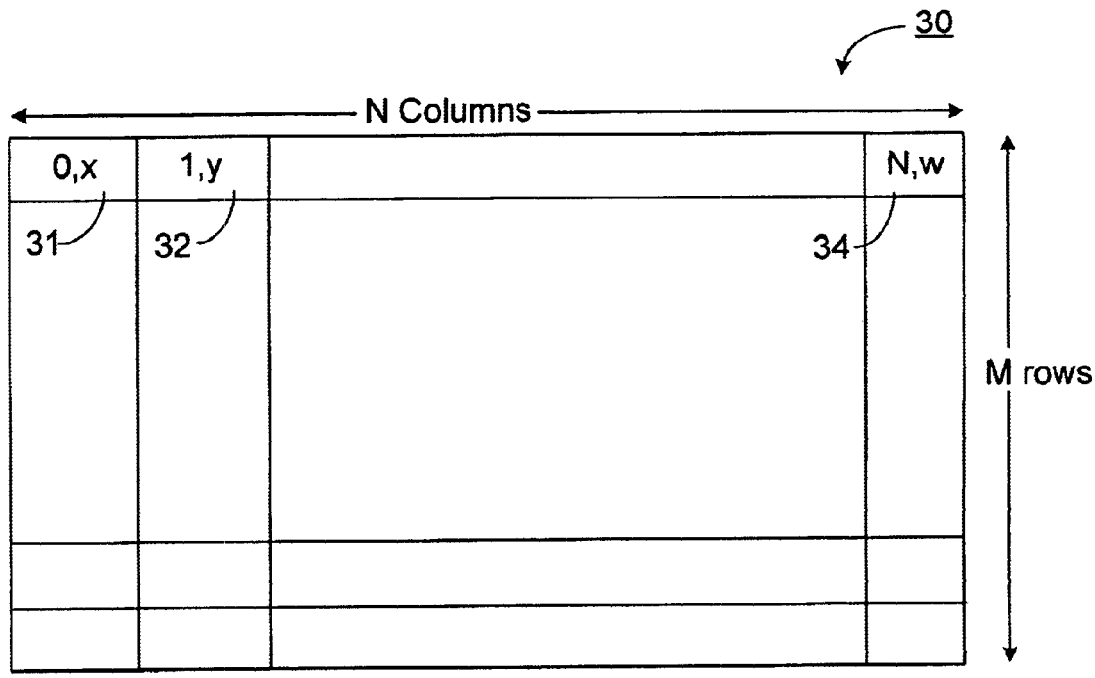
FIG. 2 is a block diagram of the data structure of a frame generated by the bus framer.
FIG. 3 is an example of the data structure of FIG. 2.

Referring to FIG. 2, each block 31 of data structure 30 contains two numbers, e.g., "0, x", "1, y" ... "N, w", where N is an integer greater than one. The first of these numbers (the row number) "0", "1", and "N" provides the port number of the data for that block. Thus, block 31 is destined for port "0", block 32 is destined for port "1", block 34 is destined for port "N", etc. In this embodiment, the ports of data receiving devices are assigned different numbers, so there is no need to identify the device in each data block. The second number in each data block (the column number), e.g., "x", "y", "w", where "x", "y", "w" are integers, provides the time slot of blocks of data for each frame, i.e., each column, of data.

By way of example, FIG. 3 shows an example of a data structure 36. As shown, each column 37, 39, etc., corresponds to a frame of data destined for a port on a receiving device. Thus, column 37 is destined for port "0", column 39 is destined for port "1", column 40 is destined for port "26", and so on. The time slots, e.g., 41 in column 37 and 42 in column 39, dictate an ordered relationship of the blocks of data in each column, i.e., the data for each port.

The data is transmitted from line/framing engine 22 to frame bus 19 according to the ordered relationship dictated by the time slots. Frame bus 19 is a time-division multiplexed (TDM) bus, over which interleaved data from different ports (which may be on different devices) is transmitted.

Line/framing engine 22 transmits the data onto frame bus 19 as soon as there is a data byte associated with an available time slot. The frame bus thus transmits a port indicator, time slot information, and port status information. Using this information, the data can then be processed by the other engines. In this regard, signaling engine 24, alarms engine 26, FDL engine 27, and overhead engine 29 receive the frame from frame bus 19, extract relevant information from the frame, and provide that information to circuitry 17 via internal bus 20.

Signaling engine 24 extracts, from a frame on frame bus 19, signaling information that is being transmitted between two elements of framer 10. In a frame being transmitted to an external device, the slot following the last data block may be used to transmit signaling information.

Alarms engine 26 searches a frame being transmitted on frame bus 19 for alarm codes (data). These alarm codes are embedded in the data structure of the frame and are used to indicate problems in a device or architecture. Alarms engine 26 extracts the alarm codes when they are found.

FDL engine 27 searches for, and extracts, messages being transmitted between two elements and that are embedded in a frame on frame bus 19. For example, transmit and receive status information may constitute a message. The messages are defined by specific codes that are present in the frame.

Overhead engine 29 identifies and extracts so-called "overhead" bits that are present in a frame on frame bus 19. Overhead bits are present in T1 and E1 formatted frames and carry code words and the like between two elements.

Circuitry 17 includes a bus arbiter 60, a host interface module 61, an internal central processing unit (CPU) 62, and an internal database 64. Circuitry 17 implements monitoring and control capabilities within framer 10.

Circuitry 17 connects to the other elements of framer 10 via internal bus 20. As noted above, internal bus 20 interconnects circuitry 17, engines 12, functional modules 16 and bus access mapper 14. Bus arbiter 60 arbitrates access to R/W bus 21 by functional modules 16 and bus access mapper 14. The arbitration scheme is described below using FIG. 4.

Host interface module 61, in this embodiment, is an eight-bit connection to an external device (not shown), such as a computer. Through host interface module 61, commands and data are passed between framer 10 and the external device. The external device may configure, interrogate, control, clear, etc. elements (e.g., engines 12, bus access mapper 14, functional modules 16, and circuitry 17) of framer 10 via host interface module 61. For example, the external device may issue commands to configure elements of framer 10, download data (e.g., status information) from framer 10, and/or upload data (e.g., configuration data) to framer 10.

Host interface module 61 connects to internal CPU 62 via pro-bus 66. Internal CPU 62 may be a microprocessor, microcontroller or the like that resides within framer 10. As was the case with the external device, internal CPU 62 may configure, interrogate, control, clear, etc. elements of framer 10. Internal CPU 62 stores data gathered from the various elements of framer 10 in internal database 64.

Internal database 64 may be a non-volatile storage medium, such as a hard disk. Internal CPU 62 may exchange data from internal database 64 with an external device via host interface module 61. Additionally, data in internal database 64 may be used by internal CPU 62 to reprogram or reconfigure the various elements of framer 10.

Functional modules 16 are interconnected, along with bus access mapper 14, by R/W bus 21. Functional modules 16 can be configured to receive or request information, such as frame time slot information, from other modules. The interface to each functional module is sufficiently generic to permit the functional modules to also be connected to internal bus 20.

In this embodiment, functional modules 16 include, but are not limited to, a scalar high-speed bus 69, slip buffers 70, a system backplane 71, a bit error rate testing (BERT) generator/analyzer 72, and a high-level data link controller (HDLC) 74. Slip buffers 70 store data temporarily to accommodate frequency and phase differences between the system clock (described below) on framer 10 and the external clock domains. Scalar high-speed bus 69 provides high-speed access to external devices (not shown). System backplane 71 has an interface, here eight pulse-code modulated (PCM) buses, to circuit boards also connected to the backplane. Other types of interfaces may also be used. Bert analyzer/generator 72 checks the frame for bit errors and reports this information back to internal CPU 62 (which may perform some reconfiguration of framer elements if sufficiently significant errors are detected). HDLC 74 embeds information in the data frame on R/W bus 21. This embedded data allows devices, such as the external host and internal CPU 62, to exchange data, status, and control information with remote CPUs.

Bus access mapper 14 interfaces frame bus 19 to R/W bus 21. For example, bus access mapper 14 performs any necessary data conversions and/or buffering to account for different sizes of frame bus 19 and R/W bus 21. In this embodiment, all buses in framer 10, including frame bus 19, internal bus 20, R/W bus 21, and pro-bus 66, run off of the same system clock, called "SYSCLK" in this embodiment. Providing a single system clock for all buses increases system stability and simplifies timing analyses and simulation. Access to external clock domains is provided via interface circuitry/boards, including backplane 71, host interface module 61, and line/framing engine 22.

Framer 10 includes an array of high-speed buses that are used to transfer data between its elements. There is one bus for each eight-port cluster of ports. As described above, framer 10 includes frame bus 19, internal bus 20, R/W bus 21, and pro-bus 66. As noted above, all of these buses run off of the same system clock, SYSCLK. Each of these buses may be made-up of one or more individual buses.

In more detail, pro-bus 66 is a local bus that is used to provide access to random access memory (RAM) (not shown) and status registers, or to propagate access to other resources of framer 10. Internal bus 20 connects to, and therefore provides access to, all memory locations of framer 10, registers and RAM, from an external device or internal CPU 62.

Frame bus 19 is comprised of a receive (Rx) frame bus (RxFrameBus) over which data is received, and a transmit (Tx) frame bus (TxFrameBus) over which data is transmitted. RxFramebus and TxFrameBus are used to communicate from/to framer engines 12. For example, line/framing engine 22 uses frame bus 19 to send information to HDLC module 74, alarms engine 26, signaling engine 24, etc.

Frame bus 19 is a frame specific bus, in which information such as a time slot number and a frame number are used to transmit data. This information is sent to bus access mapper 14, where time slots are mapped to logical channels that can be made of bits or several time slots for the same port. The logical channels are processed by functional units 16 connected to R/W bus 21. RxFrameBus carries information such as frame time slot numbers, data, port mode, port status, signaling information, and cyclic redundancy check (CRC) frame numbers. TxFrameBus carries time slot numbers, data, port mode, signaling information, cyclic redundancy check (CRC) frame numbers, and a ready signal.

R/W bus 21 is comprised of a write bus (WrBus) to which data is written, and a read bus (RdBus) from which data is read. In more detail, WrBus is used to write information to slip buffers 70. In this embodiment, WrBus carries ten bits (Bit0:9) of data. Bit 0 is the first bit to arrive at the bus interface. Bit 7 is the last bit to arrive. Bit 8 is used as a T1 F-bit and Bit 9 is used as a multiframe bit. A multiframe bit identifies multiple frames destined for a single port. That is, if more than one frame of data structure 30 is destined for the same port, the multiframe bit identifies those frames.

RdBus is used to read data from slip buffers 70 and signaling information to and from the functional modules. In this embodiment, RdBus carries ten data bits and eight signaling bits. For the signaling bits, Bits 0:3 are "stuff" bits and Bits 4:7 are data bits. A stuff bit is a filler bit that does not contain substantive data.

When a functional module has to write to R/W bus 21, it requests WrBus, and writes data to the WrBus, along with address information indicative of the functional module to which the data is destined. Any functional module that is able to drive WrBus can write to any other module that is acting as a slave of WrBus.

Access to RdBus and Wrbus is controlled by bus arbiter 60, such that each bus transfer can be performed in two clock cycles. A ready signal is used to pace the data when wait states are required on the bus. Bus transactions on R/W bus 21 occur in the following sequence:

Initiator:

Once a module requesting access has been granted the bus:

Cycle 1: Address, command (Tini) (the transfer initiate signal—see below) and data are set. The initiator module de-asserts its request (REQ) line if the module does not require the bus after the current bus cycle.

Cycle 2: Bus arbiter 60 grants the bus to the next device that requires the bus. The grant is given to the same module if that module keeps requesting bus access.

Cycle N: The module that responds to the cycle asserts Trdy (the ready signal—see below) when its transaction is completed. The next transaction can start immediately after Trdy was asserted. The module that generated Tini removes that signal when detecting Trdy, unless the module has the next cycle granted and the module requires access to the bus.

Target:

The target module that detects the current bus cycle:

Cycle 1: The target module detects when Tini is active and, if the target module detects that a block identifier (ID) on the bus matches its own block ID, then the target module responds in the current cycle.

Cycle N: The target module asserts Trdy to complete the transfer. If N is equal to two, this means that there are no wait states inserted on the bus.

If a 33 MHz (Megahertz) clock frequency is used on R/W bus 21, and the bus is eight bits wide, then a maximum transfer rate of R/W bus 21 is 16 MB/s (megaBytes-per-second) per bus.

Figure 4:
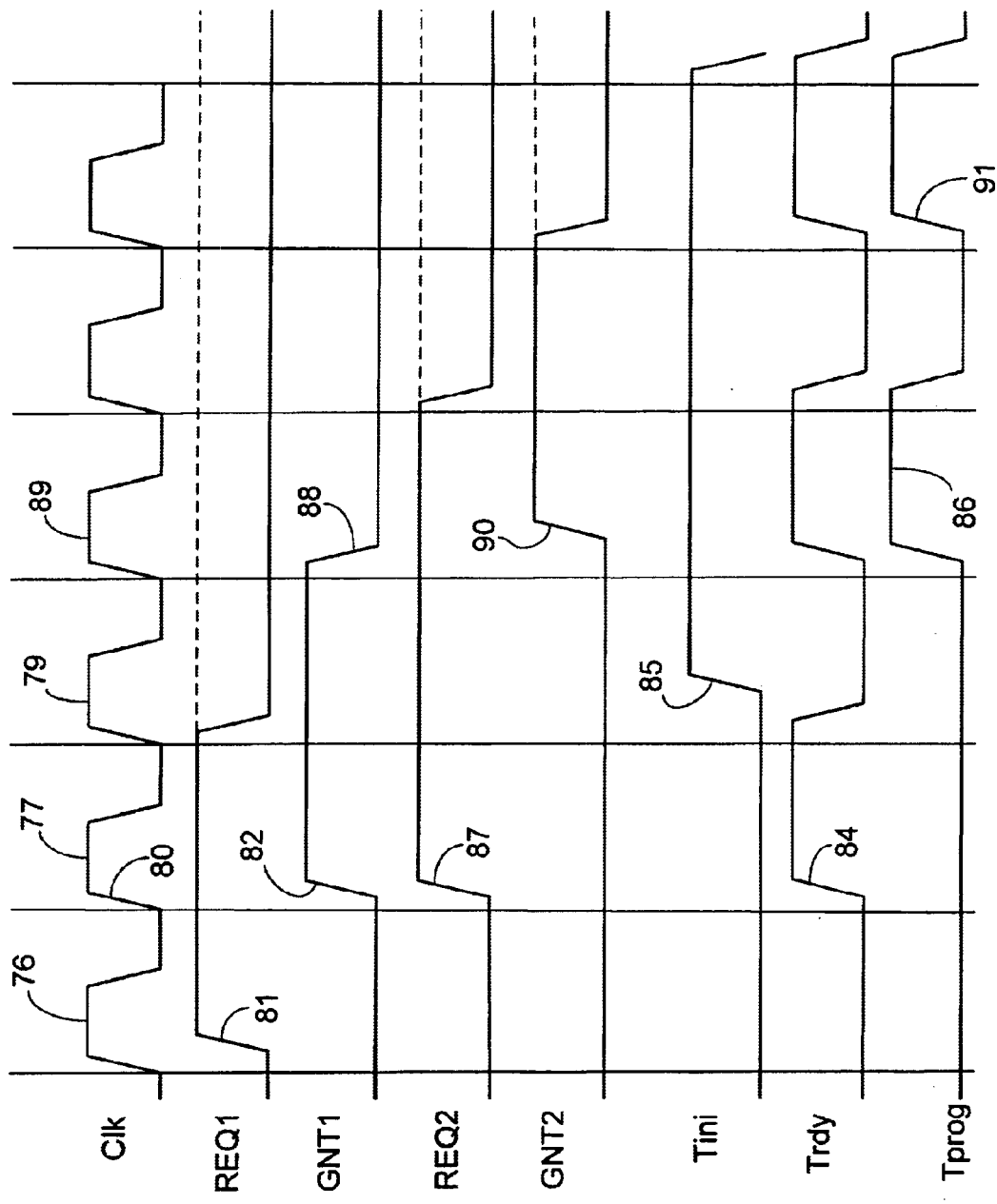
FIG. 4 is a timing diagram showing a bus arbitration scheme used by the bus framer.

In cases where two functional modules (or other devices) are trying to access R/W bus 21 at the same time, arbiter 60 regulates their access. Referring to FIG. 4, a request/grant sequence for R/W bus 21 is shown. Arbiter 60 determines which requester has control of the bus, as follows.

Arbiter 60 grants (GNT) are given in a fixed sequence with all functional modules having the same priority. Arbiter 60 assigns the modules to the bus sequentially. Once a grant is assigned to a module, the grant is maintained in the same module until that module stops requesting access to the bus or the module is forced to abort its current operation.

When a module requests access to R/W bus 21, the module asserts a request (REQ) line. FIG. 4 shows two request lines: REQ1 and REQ2. Arbiter 60 grants the bus, in response to a request, as follows. If a module that currently has the bus granted stops requesting the bus and there is another REQ active, then a new GNT is given to the module having the REQ active. If there is not a transfer in progress and there is a REQ line active, then a GNT is issued. If all the REQ lines are inactive, then all the GNT lines are inactive.

The transfer initiate signal (Tini) is generated by a functional module if the module's GNT line is active, the transfer ready signal (Trdy) is active, and the module's REQ line is active. Otherwise, Tini is kept at zero (meaning no transfer initiation). Tini is generated after detecting Trdy active and its GNT line active. In programming notation, Tini=1 if (GNT=1 and REQ=1 and Trdy=1)

The REQ line is de-asserted in the same bus cycle in which a Tini pulse is generated if there are no further requests for the bus from the same module. Otherwise, the REQ signal is kept active. An "internal" Trdy signal is generated by arbiter 60 if there is no transfer in progress (Tprog=0) and a REQ has been received that caused one GNT line to become active. In this case, the internal Trdy signal is generated in the same bus cycle in which the GNT is generated.

The "transfer in progress" signal, Tprog, is asserted when Tini is asserted and cleared when Trdy is asserted (any Trdy, even an internal Trdy) or an abort signal, Tabort, is detected. In programming notation, if (Trdy=1 OR Tabort=1), then Tprog=0 otherwise, Tini=1 then Tprog=1

R/W bus 21 is in IDLE mode when there are no Tini or Trdy signals on the bus and all GNT lines are at zero. The first Trdy signal after an IDLE is generated by arbiter 60 to assign R/W bus 21 to a requesting module. The Trdy signal thus enables back-to-back bus transfers by different modules 16 in adjacent bus cycles (i.e., without skipping a cycle).

Arbiter 60 generates the abort signal, Tabort, as follows. Fifteen clock cycles after Tini is asserted, if no other module asserts Trdy, then it is assumed that no module will respond to the access or that a transfer did not start. In this case, there a time-out situation, since this amount of cycles should permit even a slow module to respond. When a module is requesting R/W bus 21, access is granted and, if the module does not start the cycle in eight clock cycles after Trdy is asserted, there is a time-out. (It is assumed that the module is not able to start a cycle and the grant is therefore removed from the module.) If the Tabort signal is generated, then the module that generated the Tabort signal uses Tabort as a Trdy signal and completes the current cycle. If an initiator module keeps requesting the bus, then the initiator module maintains control of the bus.

By way of example, in FIG. 4, each bus cycle 76, 77, 79, etc. is initiated by a rising clock (Clk) pulse (e.g., 80). At time 81, a functional module issues a request (REQ1) for R/W bus 21. Since no other modules have control of R/W bus 21, in the next cycle 77, arbiter 60 grants (GNT1) 82 the request (REQ1). If there are no other transfers on the bus, arbiter 60 asserts Trdy 84. In the next bus cycle 79, with Trdy, REQ1 and GNT1 all asserted, the functional module asserts Tini 85. Arbiter 60 then maintains a transfer (Tprog) 86 signal internally to indicate that there is a current transfer on R/W bus 21.

At time 87, a second functional module issues a request (REQ2) for R/W bus 21. Since GNT1 is already asserted, in the next bus cycle 79, arbiter 60 does not grant the second functional module access to R/W bus 21. Rather, arbiter 60 waits until the GNT1 goes low 88 (cycle 89) before granting (GNT2) 90 the second functional module access to R/W bus 21. Since different functional modules are requesting access (REQ1 and REQ2), the Tini signal 85 remains high. As was the case above, in the next bus cycle, arbiter 60 maintains a transfer (Tprog) 91 signal internally to indicate that there is a current transfer on R/W bus 21.

All or part of framer 10 may be implemented in hardware, software, or a combination of the two. All or part of framer 10 may be implemented in computer programs executing on programmable machines that each includes a processor and a storage medium readable by the processor (including volatile and non-volatile memory and/or storage elements). Each such program may be implemented in a high level procedural or object-oriented programming language to communicate with a computer system. However, the programs can be implemented in assembly or machine language. The language may be a compiled or an interpreted language.

Each computer program may be stored on an article of manufacture, e.g., a storage medium, such as a CD-ROM, hard disk, or magnetic diskette, that is readable by a general or special purpose programmable computer for configuring and operating the computer when the storage medium or device is read by the computer to implement all or part of framer 10.

The states of finite state machines (FSMs) used by the elements of framer 10 may be stored in RAM, rather than flip-flops or registers. This reduces the hardware needed for framer 10 and increases its overall efficiency.

Framer 10 is not limited to the embodiments described above. For example, framer 10 is not limited to the specific hardware or software shown in the figures. Framer 10 is not limited to use with the data structure of FIGS. 2 or 3. Framer 10 is not limited to use with the arbitration scheme of FIG. 4. Framer 10 is not limited to use with E1 or T1 format frames. Framer 10 may be used with J1 format frames or with any other type of frame. Framer 10 may use different physical bus structures than those described above.

Other embodiments not described herein are also within the scope of the following claims.

What is claimed is:

1. A bus framer comprising:
   an engine which extracts information from a frame of data being transmitted over a time-division multiplexed bus, wherein the frame of data comprises a data structure having blocks arranged in N rows and M columns, where N and M are integers that are greater than one, a block including data used to implement a bus frame protocol and designating a destination port of a receiving device and a time slot for the data; and
   a processor which receives the information from the engine over an internal bus and forwards the information.

2. The bus framer of claim 1, further comprising:
   a mapper which maps the frame of data on the time-division multiplexed bus to a read/write bus; and
   a functional module which receives data from the read/write bus and which handles the data.

3. The bus framer of claim 1, further comprising:
   a storage medium for storing the information in a database; and
   an interface module which provides a link to an external device;
   wherein the processor forwards the information to at least one of the storage medium and the interface module.

4. The bus framer of claim 1, further comprising:
   a framing engine which generates the frame and outputs the frame to the time-division multiplexed bus.

5. The bus framer of claim 1, wherein the engine comprises one of (a) a signaling engine which extracts signaling information from the frame, (b) an alarms engine which extracts alarm codes from the frame, (c) a facility data link engine which extracts messages from the frame, and (d) an overhead engine which extracts overhead bits from the frame.

6. The bus framer of claim 1, further comprising:
   a read/write bus;
   a plurality of functional modules which communicate with the engine via the read/write bus; and
   an arbiter which regulates access of the plurality of functional modules to the read/write bus.

7. The bus framer of claim 2, wherein the time-division multiplexed bus, the internal bus, and the read/write bus all run off the same clock.

8. The bus framer of claim 2, wherein the functional module comprises one of (a) a scalar high-speed bus, (b) a slip buffer which stores data temporarily to accommodate frequency and phase differences between a clock of the bus framer and external clock domains, (c) a system backplane with a connection to an external device, (d) a bit error rate testing generator/analyzer, and (e) a high-speed data link controller.

9. The bus framer of claim 4, wherein the framing engine stores the frame in memory prior to outputting the frame.

10. The bus framer of claim 6, wherein the arbiter grants a first of the plurality of functional modules access to the read/write bus in a first bus cycle, and grants a second of the plurality of functional modules access to the read/write bus in a second bus cycle, the second bus cycle immediately following the first bus cycle.

11. A method comprising:
    using an engine to extract information from a frame of data being transmitted over a time-division multiplexed bus, wherein the frame of data comprises a data structure having blocks arranged in N rows and M columns, where N and M are integers that are greater than one a block including data used to implement a bus frame protocol and designating a destination port of a receiving device and a time slot for the data; and
    receiving the information from the engine over an internal bus and forwarding the information.

12. The method of claim 11, further comprising:
    mapping the frame of data on the time-division multiplexed bus to a read/write bus; and
    forwarding the frame of data, over the read/write bus, to a functional module which handles the data.

13. The method of claim 11, further comprising:
    storing the information in a database on a storage medium;
    wherein the information is forwarded to at least one of the storage medium and an external device.

14. The method of claim 11, further comprising:
    generating the frame; and
    outputting the frame to the time-division multiplexed bus.

15. The method of claim 11, wherein the engine comprises one of (a) a signaling engine which extracts signaling information from the frame, (b) an alarms engine which extracts alarm codes from the frame, (c) a facility data link engine which extracts messages from the frame, and (d) an overhead engine which extracts overhead bits from the frame.

16. The method of claim 11, further comprising:
    regulating access of a plurality of functional modules to a read/write bus over which communications are exchanged with the engine.

17. The method of claim 12, wherein the time-division multiplexed bus, the internal bus, and the read/write bus all run off the same clock.

18. The method of claim 12, wherein the functional module comprises one of (a) a scalar high-speed bus, (b) a slip buffer which stores data temporarily to accommodate frequency and phase differences between an internal clock and external clock domains, (c) a system backplane with a connection to an external device, (d) a bit error rate testing generator/analyzer, and (e) a high-speed data link controller.

19. The method of claim 14, further comprising storing the frame in memory prior to outputting the frame.

20. The method of claim 16, wherein regulating comprises:

granting a first of the plurality of functional modules access to the read/write bus in a first bus cycle; and granting a second of the plurality of functional modules access to the read/write bus in a second bus cycle, the second bus cycle immediately following the first bus cycle.

21. An article comprising a machine-readable medium that stores executable instructions, the instructions causing a machine to:

extract information from a frame of data being transmitted over a time-division multiplexed bus, wherein the frame of data comprises a data structure having blocks arranged in N rows and M columns, where N and M are integers that are greater than one, a block including data used to implement a bus frame protocol and designating a destination port of a receiving device and a time slot for the data; and receive the information over an internal bus and forward the information.

22. The article of claim 21, further comprising instructions to:

map the frame of data on the time-division multiplexed bus to a read/write bus; and forward the frame of data, over the read/write bus, to a functional module which handles the data.

23. The article of claim 21, further comprising instructions to:

store the information in a database on a storage medium;

wherein the information is forwarded to at least one of the storage medium and an external device.

24. The article of claim 21, further comprising instructions to:

generate the frame; and output the frame to the time-division multiplexed bus.

25. The article of claim 21, wherein the information is extracted using an engine, the engine comprising one of (a) a signaling engine which extracts signaling information from the frame, (b) an alarms engine which extracts alarm codes from the frame, (c) a facility data link engine which extracts messages from the frame, and (d) an overhead engine which extracts overhead bits from the frame.

26. The article of claim 21, further comprising instructions to:

regulate access of a plurality of functional modules to a read/write bus over which communications are exchanged with the engine.

27. The article of claim 22, wherein the time-division multiplexed bus, the internal bus, and the read/write bus all run off the same clock.

28. The article of claim 22, wherein the functional module comprises one of (a) a scalar high-speed bus, (b) a slip buffer which stores data temporarily to accommodate frequency and phase differences between an internal clock and external clock domains, (c) a system backplane with a connection to an external device, (d) a bit error rate testing generator/analyzer, and (e) a high-speed data link controller.

29. The article of claim 24, further comprising instructions to store the frame in memory prior to outputting the frame.

30. The article of claim 26, wherein regulating comprises:

granting a first of the plurality of functional modules access to the read/write bus in a first bus cycle; and granting a second of the plurality of functional modules access to the read/write bus in a second bus cycle, the second bus cycle immediately following the first bus cycle.

* * * * *